No. 625,808. Patented May 30, 1899.
C. & H. ROE & H. KNIGHT.
POWER TRANSMITTING MECHANISM FOR MOTOR VEHICLES.
(Application filed Jan. 17, 1899.)
(No Model.) 2 Sheets—Sheet 2.
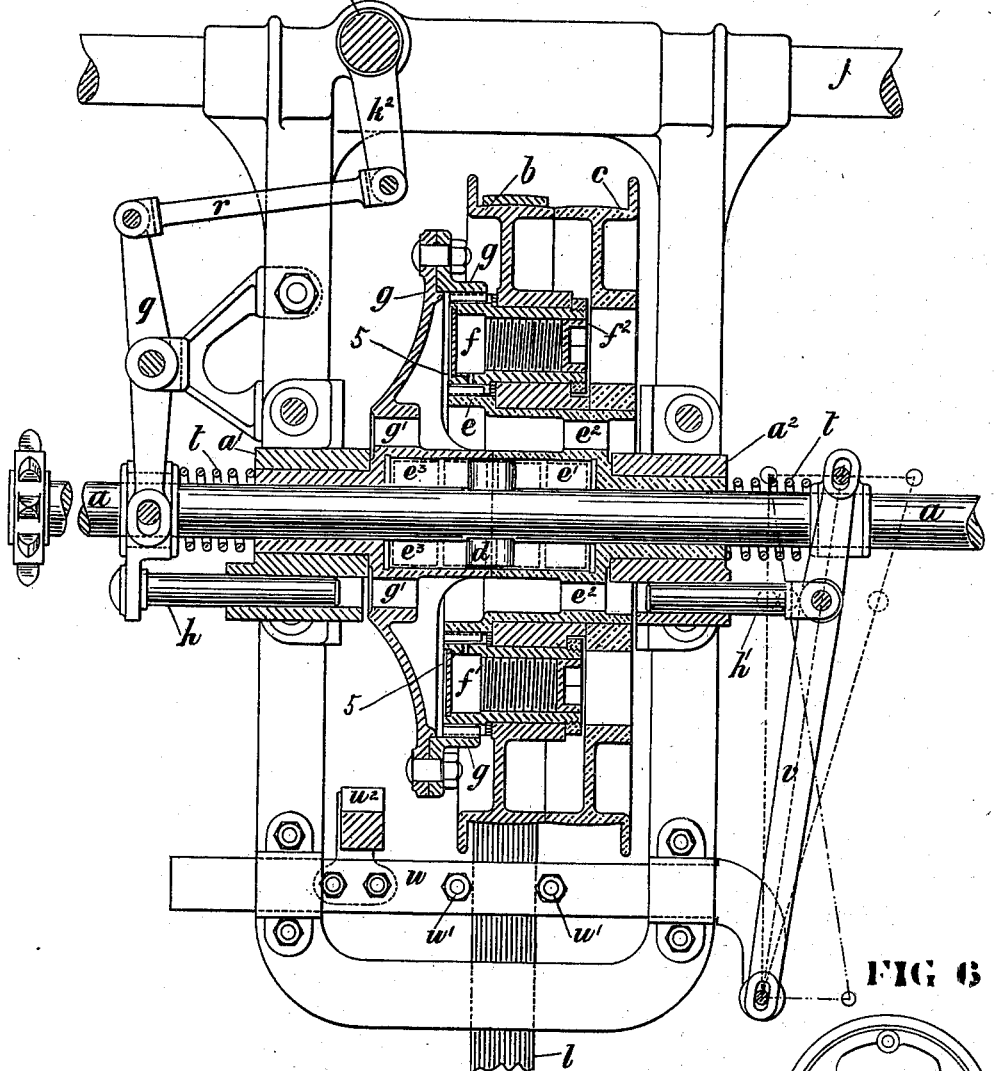
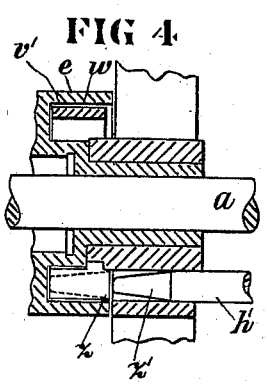
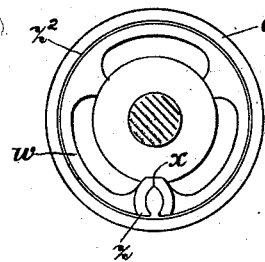
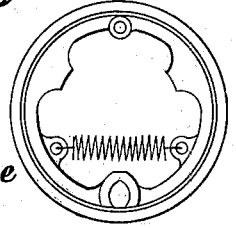
Witnesses
A. R. Gill
W. A. Turner
Inventors
Charles Roe
Henry Roe
Horace Knight
by A. W. Turner
Attorney
THE NORRIS PETERS CO., PHOTO-LITHO., WASHINGTON, D. C.

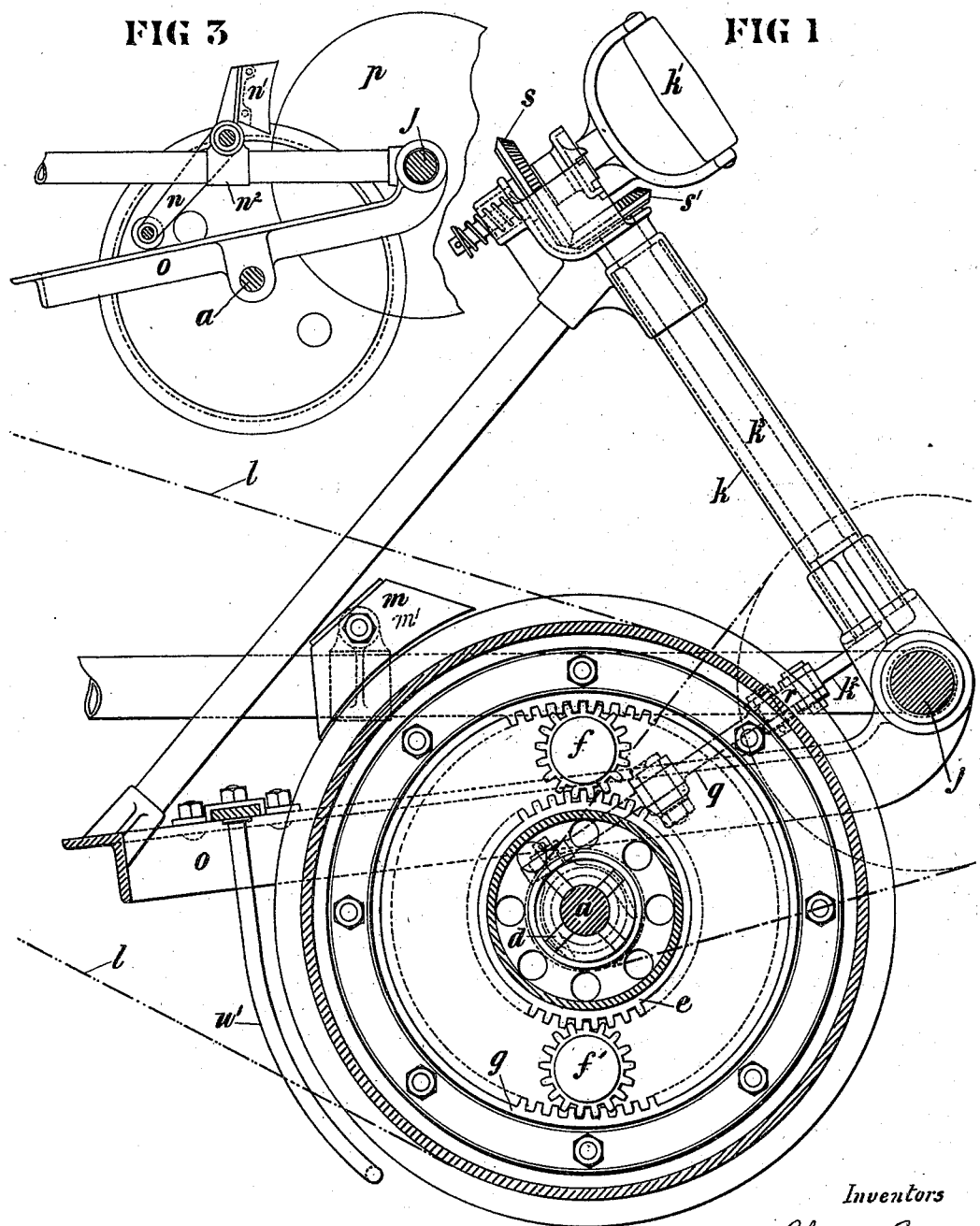

UNITED STATES PATENT OFFICE.

CHARLES ROE AND HENRY ROE, OF ASTON, AND HORACE KNIGHT, OF COVENTRY, ENGLAND.

POWER-TRANSMITTING MECHANISM FOR MOTOR-VEHICLES.

SPECIFICATION forming part of Letters Patent No. 625,808, dated May 30, 1899.

Application filed January 17, 1899. Serial No. 702,450. (No model.)

*To all whom it may concern:*

Be it known that we, CHARLES ROE and HENRY ROE, manufacturing engineers, residing at 53 Park road, Aston, and HORACE KNIGHT, mechanical engineer, residing at New street, Stoke, Coventry, in the county of Warwick, England, subjects of the Queen of Great Britain, have invented certain new and useful Improvements in Transmitting Mechanism for Use in Connection with the Motors of Motor-Vehicles, of which the following is a specification.

This invention has for its object the providing of varying speeds especially applicable for actuating the shafts of motor-cars and the like and also applicable for actuating the shafts of driven machinery of any kind where change of speed of the driven shaft is required.

This invention has also for its object the providing of means for applying a brake and relieving the driving-belt of driven machinery.

We will now proceed to describe, with reference to the accompanying drawings, the manner in which our invention is constructed and used.

Figure 1 represents a sectional side elevation of our improved mechanism. Fig. 2 represents a sectional plan of Fig. 1. Fig. 3 represents the brake mechanism applied to the brake-drum on the back axle. Figs. 4, 5, and 6 show modifications of locking device.

In carrying out our invention the intermediate shaft $a$, as represented at Figs. 1, 2, and 3, is raised or lowered radially from center of back axle $j$, such lowering being effected by means of the levers $k$ and the lever-handle $k'$, so that when the shaft is lowered the driving-belt will be tightened to the required degree of tension, and thereby drive either of the pulleys $b$ and $c$, as shown at Fig. 2.

When the shaft $a$ is lifted sufficiently high, the pulleys $b$ and $c$ will take contact with the brake-blocks, as shown at $m$ and $m'$, Fig. 1, the block represented in dotted line $m'$ being behind the block represented at $m$. Such contact with the brakes $m$ and $m'$ aforesaid prevents the pulleys $b$ and $c$ from revolving. At the same time the driving-belt would become slack and cease to drive.

The supplementary brake (shown at Fig. 3) is operated in the following manner: The brake-lever $n$, carrying the brake-block $n'$, is free to rock on its fixed bracket $n^2$, and when the shaft $a$ (shown at Fig. 3) is lifted by means of the levers $k$ and lever-handle $k'$ the frame $o$ (shown at Fig. 3) causes the brake-lever $n$ to rock on the bracket $n^2$, and thereby moves the brake-block $n'$ in contact with the brake-drum $p$, thus stopping the motor-car or other driven machinery to which our invention is applied.

The pulleys and gearing are shown on the drawings in connection with the intermediate shaft $a$; but the crank-shaft or back axle $j$ can be utilized when found advantageous.

The shaft $a$, Figs. 1, 2, and 3, is driven by means of the pulleys $b$ and $c$, and such pulleys $b$ and $c$ are actuated through the driving-belt $l$ from the motor-shaft in conjunction with the new intervening gear, hereinafter described. When the belt $l$ is driving on the pulley $b$, as shown at Fig. 2, the shaft $a$ rotates in an opposite direction to that which it would when driven by means of pulley $c$.

We will now describe the method whereby the shaft $a$ and driving-key $d$ are slid laterally within their bearings.

On the shaft $a$ is secured the driving-key $d$, as shown at Figs. 1 and 2. The shaft $a$ is free to slide through suitable bearings $a'$ and $a^2$ from right to left or from left to right. The driving-key $d$ slides with the shaft $a$, and the sliding of such shaft $a$ is accomplished by means of the lever $q$, the connecting-rod $r$, the levers $k$, and the lever-handle $k'$, in combination with the bevel-gear $s$ and $s'$. The action of the aforesaid levers is as follows: We partly rotate the bevel-wheels $s$ by means of the lever-handle $k'$. A rotary movement is thereby given to the bevel-wheel $s'$, which in turn transmits the motion and partly rotates the lever $k^2$ (shown at Fig. 2) and by means of the connecting-rod $r$ imparts a movement to lever $q$, Fig. 2, thereby causing the shaft $a$ to slide through the aforesaid bearings $a'$ and $a^2$.

When the driving-key $d$ is situated centrally within the driving-bosses of gear-wheels $g$ and $e$, all the gear-wheels are locked and rotate with shaft $a$ at their normal speed.

By sliding the shaft $a$ to the extreme right the stop-pin $h$ engages with the wheel $g$ at $g'$, thereby preventing the wheel $g$ from rotating. Simultaneously the driving-key $d$ would shift an equal distance to the right, and thereby come in contact with the internal driving-surface $e'$ of wheel $e$. As the pulley $b$ revolved the pinions $f$ and $f'$ would roll around the fixed wheel $g$ and impart motion to the toothed wheel $e$, which, being in contact with the driving-key $d$, causes the shaft $a$ to revolve at a speed governed by the number of teeth in the gear-wheels $e$, $f$, and $g$. By sliding the shaft to the extreme left the stop-pin $h$ is withdrawn from $g'$ and the stop-pin $h'$ engages with the wheel $e$ at $e^2$, thereby preventing the wheel $e$ from rotating. Simultaneously the driving-key $d$ has shifted to the left, and thereby come in contact with the internal driving-surface $e^3$ of the internal toothed wheel $g$. As the pulley $b$ revolves the pinions $f$ and $f'$ would roll around the fixed wheel $e$ and impart motion to the toothed wheel $g$, which, being in contact with the driving-key $d$, would cause the shaft $a$ to revolve at a speed governed by the number of teeth in the gear-wheels $e$, $f$, and $g$.

The springs $t$ and $t'$, Fig. 2, are provided and interposed to reduce the speed of the respective wheels $g$ and $e$ before the pins $h$ and $h'$ enter the holes $g$ and $g'$, respectively, thereby preventing any severe shock or shearing action on the stop-pins $h$ and $h'$. On shifting the belt $l$ by means of the sliding cross-bar $u$ and the dependent fork $u'$ on the pulley $c$ the wheel $e$, being then securely attached to the same, thereby becomes the driver, and the intermediate pinions $f$ and $f'$ give motion to the wheel $g$, which in turn drives the shaft $a$ through the medium of the driving-key $d$, but in an opposite direction to that in which pulley $c$ is being driven by means of the belt $l$.

The pulley $b$ is held stationary by means of blocks of rubber, wood, or other suitable material $u^2$, which take contact with such pulley $b$ when the cross-bar is shifted. Such pulley $b$ may be provided with projecting strips.

The lever $v$ is provided for the purpose of automatically withdrawing the stop-pin $h'$ from the wheel $e$ when the belt $l$ is shifted onto the reversing-pulley $c$.

The pinion $f$ is made hollow and utilized to contain a suitable lubricant. One end of such pinion $f$ is fitted with a fixed plate and the other end is fitted with a screw-plug. Between some or all of the teeth of the pinion very small holes 5 are drilled, so that by screwing the plug $f^2$ within the hollow pinion some of the lubricant is forced out through the very small holes provided between the roots of the teeth, thereby lubricating the gear-wheels.

In some cases we can, where desired, provide teeth on the faces of either of the pulleys $b$ and $c$, thereby providing facilities for actuating the same by means of gear-wheels instead of belts.

We can, where desired, connect the oscillating end of the swinging frame $o$ of our improved mechanism to the framing of the motor-car or other machine by means of a suitable supporting-spring.

In some cases, when the gear is fixed on the back axle instead of the intermediate shaft $a$ and it is inconvenient to give the required lateral movement to such axle, the said axle may be a fixture laterally and the gear arranged to move laterally upon the shaft, thus producing the same effect as when the shaft is moved and the gear fixed.

In lieu of the pin-holes $g'$ and $e^2$ and the springs $t$ for holding the wheels $g$ and $e$ we prefer in some cases to substitute the arrangement shown at Figs. 4 and 5. The wheels $g$ and $e$ would be provided with a circular recess at $v'$ to receive an elastic ring $w$, which is split at the point $x$. An additional projection $z$ is also provided for use in guiding the pin.

The pin $h'$ should be similar to the pin $h$, (shown in use at Fig. 2,) excepting that the end $z$ would be tapered, so that when the pin $h'$ is pushed inward the tapered end of such pin $h'$ would enter the division in the ring $w$ and cause such ring to expand against the face $z^2$ of the recess until the wheel was held firmly. On the withdrawal of the pin $h'$ the ring $w$ would return to its original position and so allow the wheel to turn freely.

In some cases the elastic ring $w$ may be made in two parts and hinged together, such hinged-together parts being connected together by means of a spring, as clearly shown at Fig. 6.

Having now particularly described and ascertained the nature of our said invention and in what manner the same is to be performed, we declare that what we claim is—

1. The combination, with a frame, and a slidable shaft journaled in the said frame and provided with a driving-key; of an internal toothed wheel and an external toothed wheel arranged on opposite sides of the said key and engaging with it alternately, two driving-wheels supported in the said frame, one of the said driving-wheels being secured to one of the said toothed wheels, means for driving the said driving-wheels alternately, a revoluble toothed pinion carried by the other said driving-wheel and connecting the said internal and external toothed wheels, and stop mechanism carried by the said shaft and engaging with the said toothed wheels alternately, whereby the said shaft may be driven at two speeds in each direction, substantially as set forth.

2. The combination, with a driving-axle, and a brake-drum secured thereon; of a frame pivoted on the said axle, an intermediate driving-shaft journaled in the said frame and operatively connected with the said axle, a driving-wheel carried by the said shaft and started and stopped by oscillating the said frame, means for oscillating the said frame, and pivoted brake mechanism operated by the said frame and bearing against the said brake-drum, substantially as set forth.

3. In improved mechanism for actuating the shafts of motor-cars and other driven machinery the sliding of the shaft $a$ by means of the levers $k$, lever-handle $k'$ and gear-wheels $g$ and $s'$ in conjunction with the connecting-rod $r$ and lever $q$.

4. In improved mechanism for actuating the shafts of motor-cars and other driven machinery the utilization of stop-pins such as $h$ and $h'$, so actuated as to withdraw and release one stop-pin and to engage the other stop-pin for the purpose of locking one gear-wheel from rotating and liberating the other wheel to thereby change the speed of the shaft.

5. In improved mechanism for actuating the shafts of motor-cars and other driven machinery the utilization of the lever $v$ for automatically withdrawing the stop-pin $h'$ from the wheel $e$ for the purpose of reversing the direction of rotation of the shaft $a$ in combination with the block $u^2$ connected to the sliding cross-bar $u$.

6. In improved mechanism for actuating the shafts of motor-cars and other driven machinery the utilization of the hollow pierced pinion $f$ as a receptacle to contain a lubricant and to thereby lubricate the gear-wheels.

In witness whereof we have hereunto set our hands in the presence of two witnesses.

CHARLES ROE.
HENRY ROE.
HORACE KNIGHT.

Witnesses:
ALFRED WM. TURNER,
EDITH M. TURNER.